(12) United States Patent
Mohamed et al.

(10) Patent No.: US 11,041,405 B2
(45) Date of Patent: Jun. 22, 2021

(54) TURBOCHARGER TURBINE WHEEL

(71) Applicant: Garrett Transportation I Inc., Torrance, CA (US)

(72) Inventors: Ashraf Mohamed, Harbor City, CA (US); Wagner Magalhaes, Torrance, CA (US)

(73) Assignee: Garrett Transportation I Inc., Torrance, CA (US)

( * ) Notice: Subject to any disclaimer, the term of this patent is extended or adjusted under 35 U.S.C. 154(b) by 77 days.

(21) Appl. No.: 16/574,298

(22) Filed: Sep. 18, 2019

(65) Prior Publication Data
US 2021/0079809 A1    Mar. 18, 2021

(51) Int. Cl.
*F01D 5/14*   (2006.01)
*F04D 29/28*  (2006.01)
*F01D 25/24*  (2006.01)

(52) U.S. Cl.
CPC .............. *F01D 25/24* (2013.01); *F01D 5/14* (2013.01); *F05D 2220/40* (2013.01)

(58) Field of Classification Search
CPC .......... F01D 5/14; F01D 25/24; F04D 29/284; F04D 29/30; F05D 2220/40; F05D 2240/303
See application file for complete search history.

(56) References Cited

U.S. PATENT DOCUMENTS

| 4,006,997 A    | * | 2/1977 | Friberg ............... F04D 21/00  |
|                |   |        |                          415/181   |
| 2008/0229742 A1|   | 9/2008 | Renaud et al.                      |
| 2009/0047134 A1| * | 2/2009 | Chen ................ F01D 5/141    |
|                |   |        |                        416/223 R   |
| 2015/0086396 A1| * | 3/2015 | Nasir ............... F01D 17/165   |
|                |   |        |                          417/407   |

(Continued)

FOREIGN PATENT DOCUMENTS

| CN | 101915126 A  | 12/2010 |
| EP | 2 090 788 A1 | 8/2009  |

(Continued)

OTHER PUBLICATIONS

EP 20189545.5—1004—European Search Report, dated Jan. 28, 2021 (6 pages).

*Primary Examiner* — Igor Kershteyn
(74) *Attorney, Agent, or Firm* — Brian J. Pangrle

(57) ABSTRACT

A turbocharger turbine assembly can include a turbine housing that includes a longitudinal axis, an exhaust inlet, a shroud portion, and an exhaust outlet; and a turbine wheel that includes a hub that includes a rotational axis aligned with the longitudinal axis of the turbine housing, a backdisk and a nose, where the rotational axis defines an axial coordinate (z) in a cylindrical coordinate system; and blades that extend outwardly from the hub, where each of the blades includes a shroud edge, a leading edge, a trailing edge, a pressure side, and a suction side, where the shroud (Continued)

edge includes a minimum axial coordinate position where the shroud edge meets the leading edge, and a maximum axial coordinate position where the shroud edge meets the trailing edge, and where, from the minimum axial coordinate position to the maximum axial coordinate position, the shroud edge has a decreasing radial coordinate position.

15 Claims, 11 Drawing Sheets

(56) References Cited

U.S. PATENT DOCUMENTS

2017/0292381 A1* 10/2017 Ishii .................. F01D 17/14

FOREIGN PATENT DOCUMENTS

| | | |
|---|---|---|
| EP | 2 749 738 A2 | 7/2014 |
| EP | 2 894 297 A2 | 7/2015 |
| WO | 2005/059313 A2 | 6/2005 |
| WO | 2018/055375 A1 | 3/2018 |

* cited by examiner

TURBOCHARGER TURBINE WHEEL

TECHNICAL FIELD

Subject matter disclosed herein relates generally to turbocharger turbine wheels for internal combustion engines.

BACKGROUND

A turbocharger can include a rotating group that includes a turbine wheel and a compressor wheel that are connected to one another by a shaft. For example, a turbine wheel can be welded or otherwise connected to a shaft to form a shaft and wheel assembly (SWA) and a compressor wheel can be fit to the free end of the shaft. As an example, a shaft that is attached to one or more bladed wheels may be supported by one or more bearings disposed in a bearing housing, which may form a center housing rotating assembly (CHRA). During operation of a turbocharger, depending on factors such as size of various components, a SWA may be expected to rotate at speeds in excess of 200,000 rpm.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Below, an example of a turbocharged engine system is described followed by various examples of components, assemblies, methods, etc.

Figure 1:
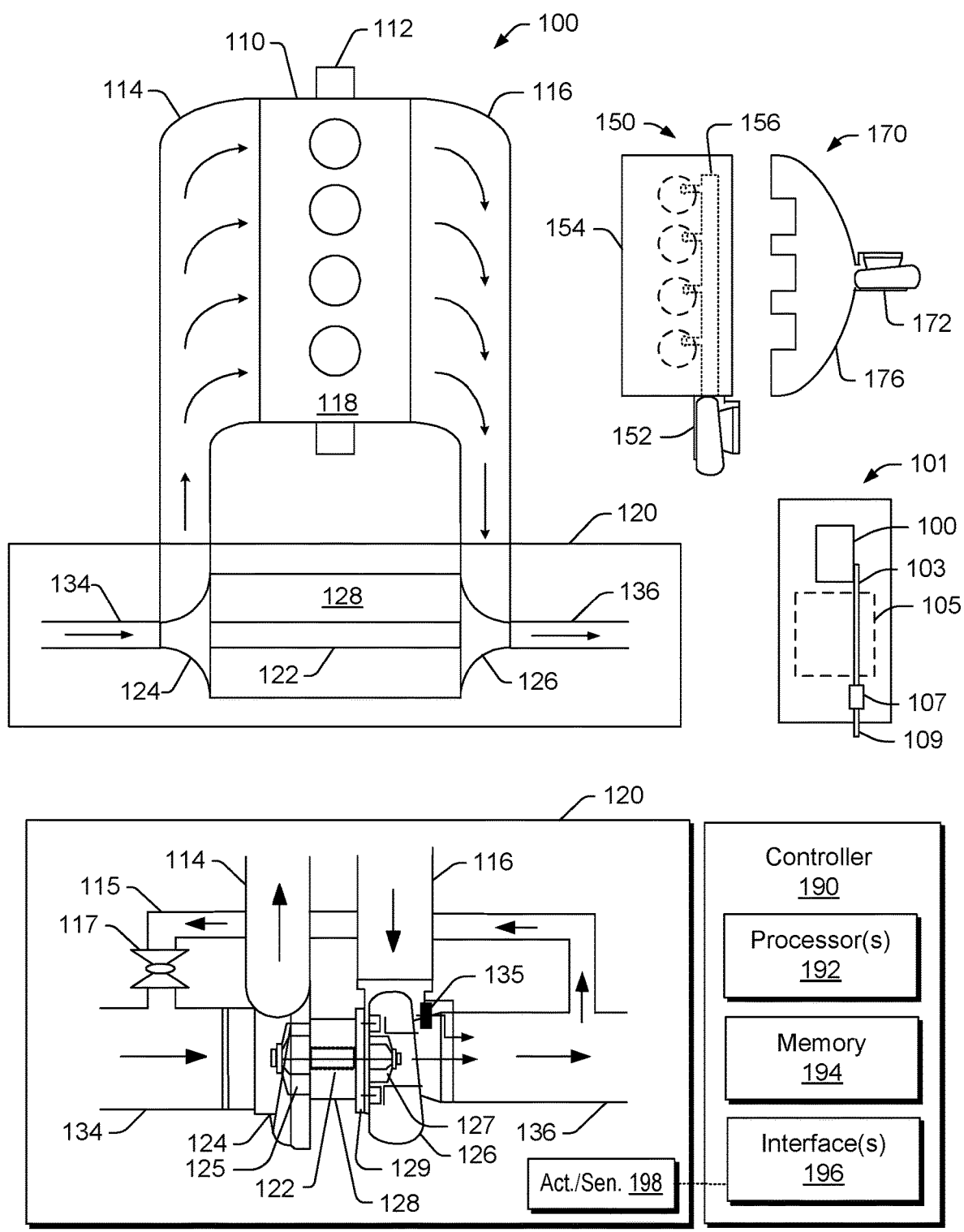
FIG. 1 is a diagram of a turbocharger and an internal combustion engine along with a controller.

Turbochargers are frequently utilized to increase output of an internal combustion engine. Referring to FIG. 1, as an example, a system 100 can include an internal combustion engine 110 and a turbocharger 120. As shown in FIG. 1, the system 100 may be part of a vehicle 101 where the system 100 is disposed in an engine compartment and connected to an exhaust conduit 103 that directs exhaust to an exhaust outlet 109, for example, located behind a passenger compartment 105. In the example of FIG. 1, a treatment unit 107 may be provided to treat exhaust (e.g., to reduce emissions via catalytic conversion of molecules, etc.).

As shown in FIG. 1, the internal combustion engine 110 includes an engine block 118 housing one or more combustion chambers that operatively drive a shaft 112 (e.g., via pistons) as well as an intake port 114 that provides a flow path for air to the engine block 118 and an exhaust port 116 that provides a flow path for exhaust from the engine block 118.

The turbocharger 120 can act to extract energy from the exhaust and to provide energy to intake air, which may be combined with fuel to form combustion gas. As shown in FIG. 1, the turbocharger 120 includes an air inlet 134, a shaft 122, a compressor housing assembly 124 for a compressor wheel 125, a turbine housing assembly 126 for a turbine wheel 127, another housing assembly 128 and an exhaust outlet 136. The housing assembly 128 may be referred to as a center housing assembly as it is disposed between the compressor housing assembly 124 and the turbine housing assembly 126.

In FIG. 1, the shaft 122 may be a shaft assembly that includes a variety of components (e.g., consider a shaft and wheel assembly (SWA) where the turbine wheel 127 is welded to the shaft 122, etc.). As an example, the shaft 122 may be rotatably supported by a bearing system (e.g., journal bearing(s), rolling element bearing(s), etc.) disposed in the housing assembly 128 (e.g., in a bore defined by one or more bore walls) such that rotation of the turbine wheel 127 causes rotation of the compressor wheel 125 (e.g., as rotatably coupled by the shaft 122). As an example a center housing rotating assembly (CHRA) can include the compressor wheel 125, the turbine wheel 127, the shaft 122, the housing assembly 128 and various other components (e.g., a compressor side plate disposed at an axial location between the compressor wheel 125 and the housing assembly 128).

In the example of FIG. 1, a variable geometry assembly 129 is shown as being, in part, disposed between the housing assembly 128 and the housing assembly 126. Such a variable geometry assembly may include vanes or other components to vary geometry of passages that lead to a turbine wheel space in the turbine housing assembly 126. As an example, a variable geometry compressor assembly may be provided.

In the example of FIG. 1, a wastegate valve (or simply wastegate) 135 is positioned proximate to an exhaust inlet of the turbine housing assembly 126. The wastegate valve 135 can be controlled to allow at least some exhaust from the exhaust port 116 to bypass the turbine wheel 127. Various wastegates, wastegate components, etc., may be applied to a conventional fixed nozzle turbine, a fixed-vaned nozzle turbine, a variable nozzle turbine, a twin scroll turbocharger, etc. As an example, a wastegate may be an internal wastegate (e.g., at least partially internal to a turbine housing). As an example, a wastegate may be an external wastegate (e.g., operatively coupled to a conduit in fluid communication with a turbine housing).

In the example of FIG. 1, an exhaust gas recirculation (EGR) conduit 115 is also shown, which may be provided, optionally with one or more valves 117, for example, to allow exhaust to flow to a position upstream the compressor wheel 125.

FIG. 1 also shows an example arrangement 150 for flow of exhaust to an exhaust turbine housing assembly 152 and another example arrangement 170 for flow of exhaust to an exhaust turbine housing assembly 172. In the arrangement 150, a cylinder head 154 includes passages 156 within to direct exhaust from cylinders to the turbine housing assembly 152 while in the arrangement 170, a manifold 176 provides for mounting of the turbine housing assembly 172, for example, without any separate, intermediate length of exhaust piping. In the example arrangements 150 and 170, the turbine housing assemblies 152 and 172 may be configured for use with a wastegate, variable geometry assembly, etc.

In FIG. 1, an example of a controller 190 is shown as including one or more processors 192, memory 194 and one or more interfaces 196. Such a controller may include circuitry such as circuitry of an engine control unit (ECU). As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate (e.g., via an actuator), an electric motor, or one or more other components associated with an engine, a turbocharger (or turbochargers), etc. As an example, the turbocharger 120 may include one or more actuators and/or one or more sensors 198 that may be, for example, coupled to an interface or interfaces 196 of the controller 190. As an example, the wastegate 135 may be controlled by a controller that includes an actuator responsive to an electrical signal, a pressure signal, etc. As an example, an actuator for a wastegate may be a mechanical actuator, for example, that may operate without a need for electrical power (e.g., consider a mechanical actuator configured to respond to a pressure signal supplied via a conduit).

Figure 2:
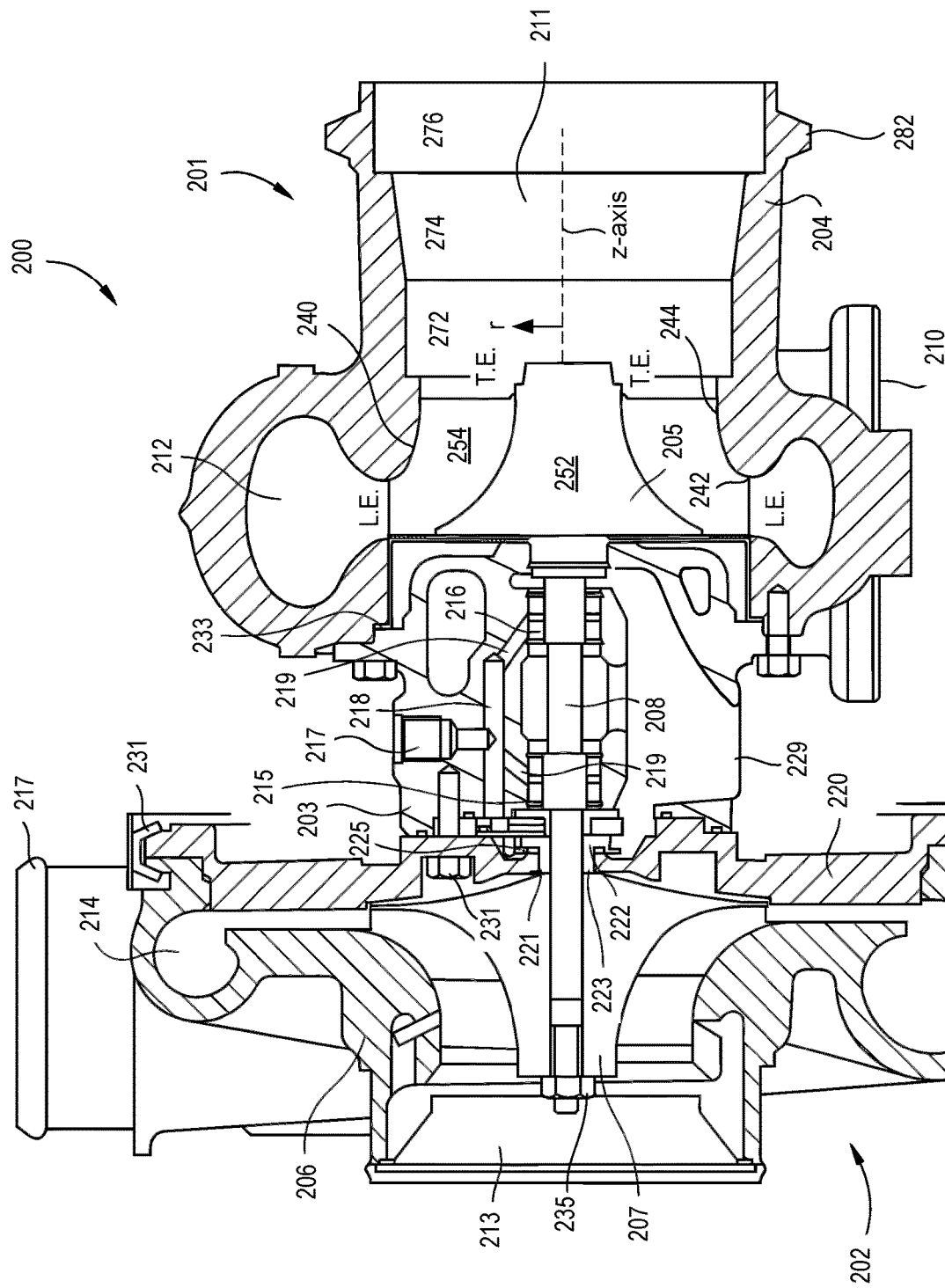
FIG. 2 is a cross-sectional view of an example of a turbocharger.

FIG. 2 shows an example of a turbocharger 200 that includes a turbine assembly 201, a compressor assembly 202 and a center housing 203. The turbine assembly 201 includes a turbine housing 204 that is shaped to accommodate a turbine wheel 205 and the compressor assembly 202 includes a compressor housing 206 that is shaped to accommodate a compressor wheel 207. As shown, a shaft 208 operatively couples the turbine wheel 205 and the compressor wheel 207 as supported by one or more bearings 215 and 216 in a through bore of the center housing 203.

As shown in FIG. 2, the turbine housing 204 can include an exhaust inlet 210 and an exhaust outlet 211 where a volute 212 is defined at least in part by the turbine housing 204. The volute 212 can be referred to as a scroll that decreases in its cross-sectional diameter as it spirals inwardly toward a turbine wheel space that accommodates the turbine wheel 205.

As shown in FIG. 2, the compressor housing 206 can include an air inlet 213 and an air outlet 211 where a volute 214 is defined at least in part by the compressor housing 206. The volute 214 can be referred to as a scroll that increases in its cross-sectional diameter as it spirals outwardly from a compressor wheel space that accommodates the compressor wheel 207.

Disposed between the compressor housing 206 and the center housing 203 is a backplate 220, which includes a bore 221 that can receive a thrust collar 222, which can abut against a base end 223 of the compressor wheel 207. As shown, the thrust collar 222 can include a lubricant slinger 225 that extends radially outward, which can help to reduce undesirable flow of lubricant (e.g., to the compressor wheel space, etc.).

The center housing 203 includes various lubricant features such as a lubricant inlet 217, a lubricant bore 218, lubricant jets 219, and a lubricant drain 229. As shown, lubricant can be provided at the lubricant inlet 217 to flow to the lubricant bore 218 and to the lubricant jets 219, which include a compressor side jet for directing lubricant to the bearing 215 and a turbine side jet for directing lubricant to the bearing 216. Lubricant can carry heat energy away from the bearings 215 and 216 as they rotatably support the shaft 208 as the turbine wheel 205 is driven by flow of exhaust through the turbine housing 204.

As shown in the example of FIG. 2, the compressor housing 206 can be clipped to the backplate 220 via a clip 231, the backplate 220 can be bolted to the center housing 203 via bolt or bolts 232 and the center housing 203 can be bolted to the turbine housing 204 via a bolt or bolts 233; noting that various other techniques may be utilized to couple the components to form a turbocharger.

In the example of FIG. 2, one or more of the housings 203, 204 and 206 may be cast. For example, the turbine housing 204 may be cast from iron, steel, nickel alloy, etc. As an example, consider a Ni-Resist cast iron alloy with a sufficient amount of nickel to produce an austenitic structure. For example, consider nickel being present from approximately 12 percent by weight to approximately 40 percent by weight. As an example, an increased amount of nickel can provide for a reduced coefficient of thermal expansion (e.g., consider a minimum at approximately 35 percent by weight). However, increased nickel content can increase cost of an Ni-Resist material; noting that density tends to be relatively constant over a large range of nickel content (e.g., approximately 7.3 to 7.6 grams per cubic centimeter). The density of Ni-Resist material tends to be approximately 5 percent higher than for gray cast iron and approximately 15 percent lower than cast bronze alloys. As to machinability, Ni-Resist materials tend to be better than cast steels; noting that increased chromium content tends to decrease machinability due to increasing amounts of hard carbides. When compared to stainless steel (e.g., density of approximately 8 grams per cubic centimeter), Ni-Resist materials can be less costly and of lesser mass (e.g., lesser density).

Ni-Resist materials tend to exhibit suitable high temperature properties, which may be at rated to over 480 degrees C. (900 degrees F.). Ni-Resist materials can be suitable for turbocharges for diesel and gasoline internal combustion engines. As an example, a diesel engine can have exhaust that may be at about 860 degrees C. and, as an example, a gasoline engine can have exhaust that may be at about 1050 degrees C. Such exhaust can be received by a turbine assembly that includes a turbine housing made of a suitable material.

As shown, the turbine housing 204 may be a relatively large component when compared to the compressor housing 206 and the center housing 203 such that the mass of the turbine housing 204 contributes significantly to the mass of the turbocharger 200.

In the example of FIG. 2, various components of the turbocharger 200 may be defined with respect to a cylindrical coordinately system that includes a z-axis centered on a through bore of the center housing 203, which can coincide with the rotational axis of a rotating assembly that includes the turbine wheel 205, the compressor wheel 207 and the shaft 208. As mentioned, a turbine wheel may be welded to a shaft to form a shaft and wheel assembly (SWA) and a compressor wheel may be threaded onto an end of a shaft (e.g., a "boreless" compressor wheel) or have a through bore that receives a free end of the shaft where a nut or other suitable component is used to secure the compressor wheel to the shaft. In the example of FIG. 2, the turbine wheel 205 is welded to the shaft 208 and a nut 235 is used to secure the compressor wheel 207 to the shaft 208 and, hence, the turbine wheel 205.

In the example of FIG. 2, a clearance exists between blades 254 that extend from a hub 252 of the turbine wheel 205 and a shroud portion 240 of the turbine housing 204. As shown, the shroud portion 240, in the cross-sectional view is "J" shaped, which can define a body of rotation that has an annular ridge portion 242 and a cylindrical portion 244. As shown, the annular ridge portion 242 can define a nozzle for exhaust that flows from the volute 212 to the turbine wheel space at an inducer portion of the turbine wheel 205, which can be defined by leading edges where each of the blades 254 includes a leading edge (L.E.). As shown, the turbine wheel 205 also includes an exducer portion where each of the blades 254 includes a trailing edge (T.E.). During operation, exhaust flows from the volute 212 via the nozzle defined in part by the annular ridge portion 242 of the shroud portion 240 to the leading edges of the blades 254, along channels defined by adjacent blades 254 of the turbine wheel 205 as confined between the hub 252 and the cylindrical portion 244 of the shroud portion 240 and then to the trailing edges of the blades 254 where the exhaust is confined by a larger diameter cylindrical wall 272, a slightly conical wall 274 and a yet larger diameter cylindrical wall 276. As shown in FIG. 2, the cylindrical wall 276 can be defined by a portion of the turbine housing 204 that includes a fitting such as an annular ridge 282 that can be utilized to secure an exhaust conduit to the turbine housing 204. Such an exhaust conduit may be in fluid communication with one or more other components such as an exhaust treatment unit, a muffler, another turbocharger, etc. As to the exhaust inlet 210 of the turbine housing 204, it too may be shaped to couple to one or more exhaust conduits such as, for example, an exhaust header, an exhaust manifold, another turbine housing (e.g., for a multi-stage turbocharger arrangement), etc.

As shown in FIG. 2, the turbine housing 204 severs various functions through its structural features and shapes thereof; however, such structural features can contribute to mass of the turbocharger.

As an example, a turbocharger may weigh from approximately 4 kilograms (e.g., 8.8 lbs) to approximately 40 kilograms (e.g., 88 lbs) or more.

As mentioned, a turbocharger can be defined with respect to a cylindrical coordinate system where a z-axis may be along a length. In the example of FIG. 2, the length of the turbine housing 204 is over 50 percent of the total length. The overall length or size of a turbocharger can be a factor when installing in an engine compartment of a vehicle as it presents design constraints.

As an example, a turbocharger can include a turbine assembly with particular features that can improve performance and reduce mass and/or size of a turbocharger. For example, consider a turbine wheel that includes a conical region that is disposed between the leading edges and the trailing edges of the blades of the turbine wheel. For example, in FIG. 2, the shroud portion 240 and blades 254 have a cylindrical shape as identified by the cylindrical portion 244. In contrast, an example turbine assembly can include a shroud portion of a turbine housing and blades of a turbine wheel that include a conical shape that provides for a reduction in axial length of the turbine wheel or a lesser axial distance between a tip of a leading edge of a blade and a tip of a trailing edge of the blade. With a turbine wheel that includes a conical shape, a turbine housing may be made smaller and hence contribute to a reduction in length and/or mass of a turbocharger, which can translate into benefits for a vehicle that includes one or more of such turbochargers (e.g., lesser mass, lesser thermal mass to cool, faster cooling, more flexibility in arrangement in an engine compartment, a smaller engine compartment, etc.).

Additionally, or alternatively, performance can be improved by use of blades that include a conical portion where a turbine housing can include a shroud portion that includes a similar, matching conical portion. With increased performance, benefits may be realized, for example, as to balances between size, mass and performance.

As an example, a turbine wheel with a conical portion can provide performance benefits that can result in a reduction in overall size and mass of a turbine housing. For example, consider a reduction in volute size such that material demands can be reduced. As shown in FIG. 2, the volute 212 is defined by the turbine housing 204, particularly by an annular wall that has a cross-sectional "C" shape. As an example, a reduction in turbine wheel outer diameter can allow for a reduction in the maximum radius of a turbine housing (e.g., to form a volute that has a maximum radius).

The turbocharger 200 of FIG. 2 can be cooled via one or more media, such as lubricant (e.g., oil), water (e.g., radiator fluid, etc.), and air (e.g., via an environment with ambient air or vehicle engine compartment air).

As to lubricant cooling (e.g., oil, whether natural, synthetic, etc.), some tradeoffs exists. For example, if a carbonaceous lubricant reaches too high of a temperature for too long of a time (e.g., consider a time-temperature dependence), carbonization (e.g., also known as coke formation or "coking"), may occur. Coking can exasperate heat generation and heat retention by any of a variety of mechanisms and, over time, coke deposits can shorten the lifetime of a lubricated bearing system. As an example, coke deposits may cause a reduction in heat transfer and an increase heat generation, which may lead to failure of the bearing system. To overcome coking, a turbocharger may be configured to improve lubricant flow. For example, a pump may pressurize lubricant to increase flow rates to reduce residence time of lubricant in high temperature regions. However, an increase in lubricant pressure can exasperate various types of lubricant leakage issues. For example, an increase in lubricant pressure of a bearing system can result in leakage of lubricant to an exhaust turbine, to an air compressor or both. Escape via an exhaust turbine can lead to observable levels of smoke while escape via an air compressor can lead to lubricant entering an intercooler, combustion chambers (e.g., combustion cylinders), etc.

As to temperatures experienced during operation, they can depend on temperature of exhaust flowing to an exhaust turbine of a turbocharger, which can depend on whether an internal combustion engine is gasoline or diesel fueled (e.g., as mentioned, a diesel engine may have exhaust at about 860 degrees C. and a gasoline engine may have exhaust at about 1050 degrees C.). Also, as to temperature, consider the example arrangements 150 and 170 of FIG. 1 where the turbine housing assemblies 152 and 172 are in close proximity to combustion cylinders, which may result in the turbine housing assemblies 152 and 172 experiencing higher exhaust temperatures and/or higher ambient temperatures.

Figure 3:
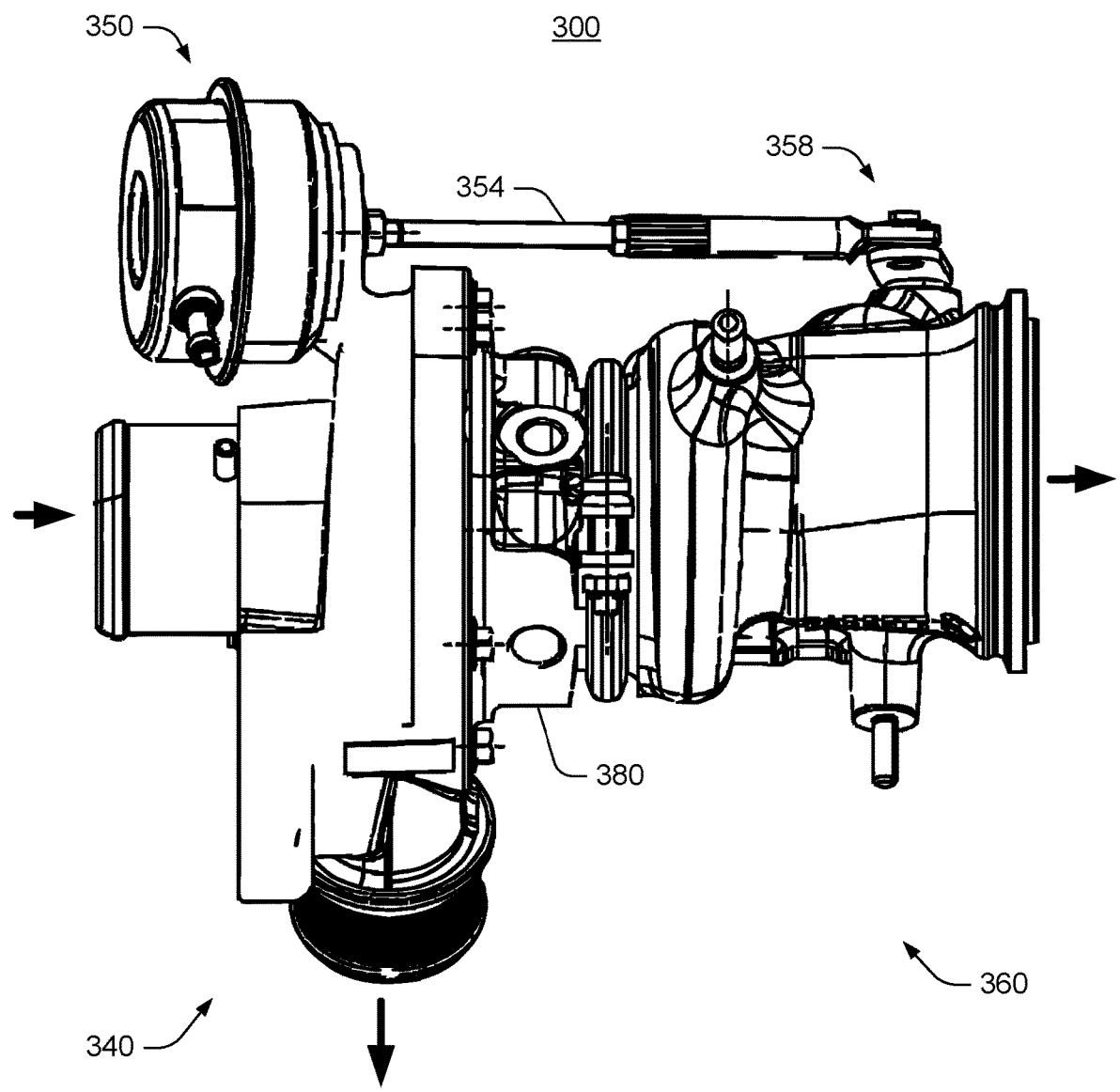
FIG. 3 is a side view of an example of a turbocharger.

FIG. 3 shows an example of a turbocharger 300 that includes a compressor assembly 340 with a compressor housing for a compressor wheel, a turbine assembly 360 with a turbine housing for a turbine wheel, a center housing 380 for a bearing, bearings or a bearing assembly to rotatably support a shaft of a shaft and wheel assembly (SWA), and an actuator 350 with a linkage 354 to a control arm assembly 358 for a wastegate of the turbine assembly 360. The turbocharger 300 can include one or more of the components shown in FIG. 2. In the view of FIG. 3, the exhaust inlet of the turbine assembly 360 is not visible because it is on the opposite side. General directions of flow of air or exhaust are indicated by arrows. The actuator 350 is shown as being mounted to the compressor assembly 340, which can help to reduce temperatures experienced by the actuator 350 (e.g., compared to having the actuator mounted on a turbine housing). The turbocharger 300 can be part of a vehicle such as, for example, the vehicle 101 of FIG. 1. As an example, the turbine assembly 360 may optionally be arranged such as in one of the example arrangements 150 or 170 of FIG. 1.

Figure 4:
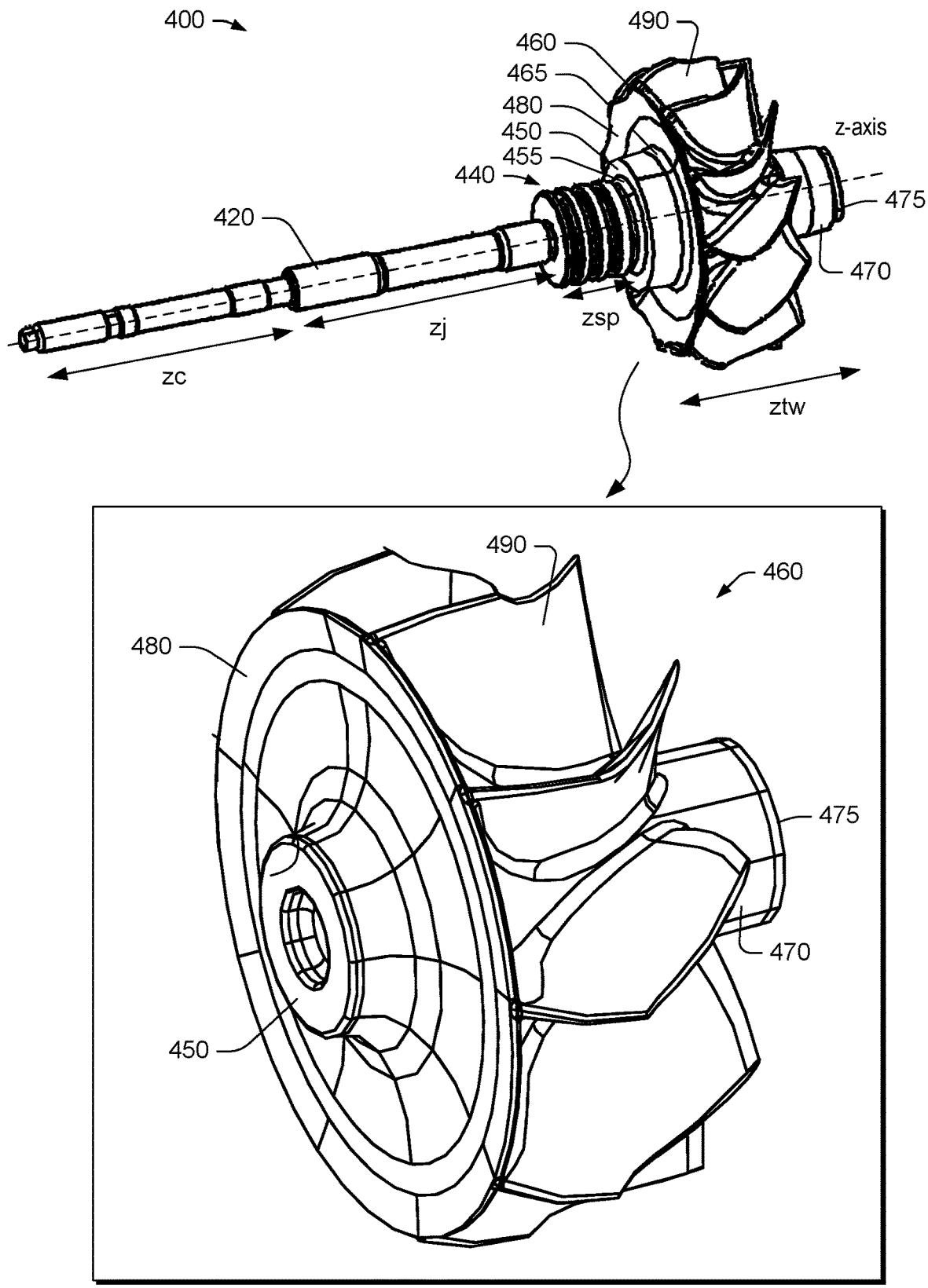
FIG. 4 is a perspective view and an enlarged view of an example of a shaft and wheel assembly (SWA)

FIG. 4 shows a perspective view of a shaft and wheel assembly (SWA) 400. As shown, the SWA 400 includes a shaft 420, a seal portion 440 and a turbine wheel 460 where the turbine wheel 460 includes a nose 470, a backdisk 480 and blades 490. The turbine wheel 460 can be a single, unitary piece of material and referred to as a single component or a single piece. A portion of the turbine wheel 460 can be referred to as a hub 465. For example, the backdisk 480 can be a part of the hub 465 from which the blades 490 extend. The hub 465 can include the backdisk 480 and the nose 470, which includes a nose end 475, and extend the length of the turbine wheel as indicated by an axial length ztw as measured along a rotational z-axis of the SWA 400.

As an example, the seal portion 440 can be formed in part by the turbine wheel 460 and in part by the shaft 420, can be formed by the shaft 420 or can be formed by the turbine wheel 460. As an example, the seal portion 440 can be formed at least in part by the shaft 420. The seal portion 440 can be defined by an outer radius. In FIG. 2, a seal portion is shown as disposed at least in part in a turbine side bore opening of the center housing 203 where one or more seal elements (e.g., rings, etc.) are disposed in one or more annular grooves of the seal portion and/or of a turbine side bore wall that defines the turbine side bore opening. With reference to FIG. 2, the seal portion can form a seal or seals between a lubricant region of the center housing 203 and an exhaust region in which the turbine wheel 205 is disposed.

As shown in FIG. 4, the SWA 400 can include a shoulder or step down from the turbine wheel 460 toward the shaft 420. For example, a shoulder can step down from an outer surface of the shaft joint portion 450 to an outer surface 455, which may be at a radius equal to or approximately equal to that of the seal portion 440. The shaft joint portion 450 can include a surface that is an annular axial face that can form a portion of a shoulder.

As an example, the shaft joint portion 450 can include a shaft joint surface that can be defined in part by a shaft joint radius. For example, consider a shaft joint surface that can be utilized to join a shaft to a turbine wheel (e.g., via welding, etc.). In such an example, the shaft joint surface of the turbine wheel can be a mating surface that mates with a turbine wheel joint surface of a shaft where the two surfaces can be brought into proximity or direct contact and joined (e.g., via welding). As an example, a shaft joint surface may be an annular surface that can be welded to a surface of a shaft to form a SWA (e.g., to form a weld or welds).

The SWA 400 can include dimensions such as, for example, axial dimensions for a compressor wheel portion zc, which may include one or more pilot surfaces, a set of threads, etc., and a bearing portion zj, which may include one or more journal surfaces (e.g., a compressor side journal surface and a turbine side journal surface, etc.).

As shown in FIG. 4, the seal portion 440 can include one or more annular grooves that may be configured to receive one or more seal elements (e.g., one or more seal rings). As shown, the seal portion 440 can be defined in part by an axial dimension zsp. As an example, a seal element can be a split ring such as, for example, a piston ring. As mentioned, a SWA may be formed by welding a shaft to a turbine wheel such that the resulting SWA has a shaft and a turbine wheel arranged and fixed along a common rotational axis.

FIG. 4 shows an enlarged perspective view of a portion of the SWA 400, specifically the turbine wheel 460. As an example, a turbine wheel may be defined using diameters, which can be circles that inscribe features of the turbine wheel. For example, where a turbine wheel includes an odd number of blades, a diameter as a line may not be drawn from a leading edge of one blade to a leading edge of another blade. In such an example, diameter can be defined via a circle that inscribes the leading edges of the blades or, for example, mathematically, as twice a radius. A turbine wheel may be defined by an inducer diameter (e.g., associated with exhaust inflow) and an exducer diameter (e.g., associated with exhaust outflow). As an example, an inducer diameter can exceed an exducer diameter. As an example, a trim of a turbine wheel can be defined using its inducer diameter and its exducer diameter. Where diameter is mentioned, it may refer to a diameter of a circle that can be drawn with respect to features of a turbine wheel. As an example, a turbine wheel may be defined in a cylindrical coordinate system that includes axial, radial and azimuthal coordinates (e.g., r, z, and Θ).

As an example, a balancing process may alter one or more dimensions of a turbine wheel, for example, via removal of material. For example, consider removal of material from the nose 470 of the turbine wheel 460 of the SWA 400. As shown, the nose 470 has an outer diameter that is less than an outer diameter of the backdisk 480. Another option can be to remove material from the backdisk 480. As an example, material may be removed from the shaft joint portion 450. In such an example, material removal may have minimal impact on the backdisk 480 as to its ability to support the blades 490.

As shown in the example of FIG. 4, an exhaust turbocharger turbine wheel 460 can include the hub 465 that includes the nose 470, the backdisk 480, a shaft joint portion 450 (e.g., as part of the backdisk 480) and a rotational axis (z-axis); the blades 490 that extend from the hub 465 to define exhaust flow channels where each of the blades 490 includes a leading edge (L.E.), a trailing edge (T.E.), a hub profile, a shroud profile defined by a shroud edge (S.E.), a pressure side (P.S.), and a suction side (S.S.); where the backdisk 480 includes an outer perimeter radius measured from the rotational axis of the hub 465 and an intermediate radius at an outer perimeter of the shaft joint portion 450 measured from the rotational axis of the hub 465.

As to the shaft joint portion 450, it is shown as being substantially cylindrical. As an example, the backdisk 480 can be defined as a lower portion of the hub 465 that includes at least part of the shaft joint portion 450 and that extends outwardly to a maximum outer perimeter of the backdisk 480.

As explained, the shaft joint portion 450 can join the seal portion 440, which may be an integral part of the shaft 420. As an example, the seal portion 440 can be welded to the shaft joint portion 450 to form a welded joint that is to permanently join the shaft 420 and the turbine wheel 460 to form the shaft and wheel assembly (SWA) 400.

As an example, a shaft may be made of a material that is the same as that of a turbine wheel or that is different from that of a turbine wheel. Where materials differ, the materials can generally be amenable to welding such that a SWA can be formed. As an example, a compressor wheel may be manufactured from a material that has a lesser specific gravity than a material of a turbine wheel. In general, a compressor wheel experiences operational temperatures that are less than those of a turbine wheel. As an example, a turbine wheel can be made of a nickel alloy. For example, consider a NiCrFe-based alloy (e.g., HASTALLOY™ material, INCONEL™ material, etc.) or another alloy. In contrast, a compressor wheel may be made of a lighter material such as, for example, aluminum or an aluminum alloy. A turbine wheel material may have a specific gravity that is double or more than double that of aluminum (approximately 2.7 versus approximately 8.4 for INCONEL™ 625 material).

A rotating assembly can have a mass defined by a sum of individual masses of components that make up the rotating assembly (see, e.g., FIG. 2 where a rotating assembly includes the turbine wheel 205, the compressor wheel 207 and the shaft 208). As mentioned, flow of exhaust to an exhaust turbine disposed in a turbine housing can be a driver for rotation of a rotating assembly where mass and other factors can determine how much exhaust must flow before rotation commences.

Figure 5:
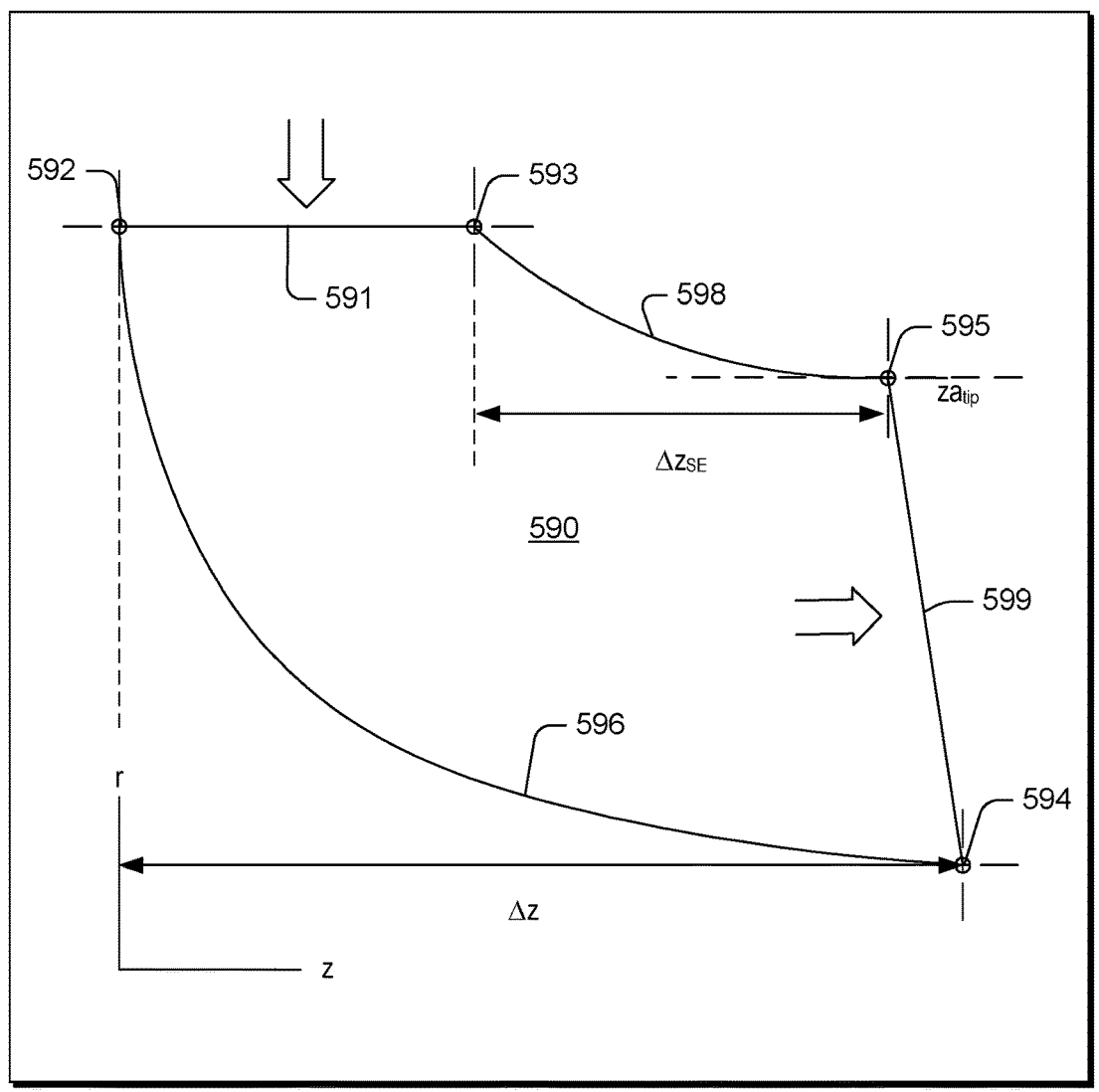
FIG. 5 is a projected view of an example of a blade of a turbine wheel with a radial inflow leading edge and a projected view of an example of a blade of a turbine wheel with a mixed-flow inflow leading edge.
Figure 5:
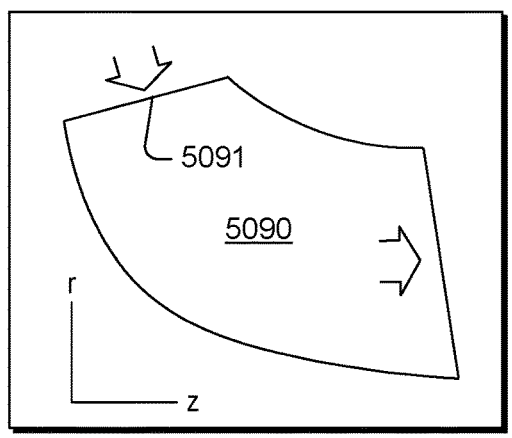

FIG. 5 shows a representation of an example of a blade 590 of a turbine wheel where the blade 590 includes various blade features such as a leading edge 591 (or inducer edge), a trailing edge 599 (or an exducer edge), a backdisk point 592 of the leading edge 591, a tip point 593 of the leading edge 591, a hub point 594 of the trailing edge 599, a tip point 595 of the trailing edge 599, a hub profile 596 that extends from the leading edge 591 to the trailing edge 599, and a shroud edge 598 (e.g., a shroud profile) that extends from the leading edge 591 to the trailing edge 599. A turbine wheel can include a blade outer diameter at the tip point 593 of the leading edge 591 (e.g., inducer edge); another blade outer diameter at the tip point 595 of the trailing edge 599 (e.g., exducer edge); and a blade diameter at the hub point 594 at the trailing edge 599 (e.g., exducer edge).

As mentioned, a circle may inscribe blade features to define a diameter. As an example, a diameter Dle (diameter leading edge) and a diameter Dte (diameter trailing edge) may not correspond to circles but rather correspond to a particular cross-section, where a circle would have a slightly larger diameter than Dle and another circle would have a slightly larger diameter than Dte.

FIG. 5 also shows arrows that indicate intended direction of flow of exhaust, from the leading edge 591 to the trailing edge 599 where two adjacent blades define a flow channel for exhaust (e.g., an exhaust flow channel). As mentioned, one side of a blade can be defined as a pressure side while an opposing side of the blade can be defined as a suction side. The representation of FIG. 5 is a projected view such that the concave and convex shapes of the blade 590 are not seen. In FIG. 5, the blade 590 can be defined with respect to radial and axial coordinates. As an example, a polar angle plot may be utilized to provide for additional information that defines the blade 590. For example, consider a plot of wrap angle along a camber line. As an example, the blade 590 may be defined using one or more equations, parameters, etc., of an airfoil or an impeller.

As an example, a turbine wheel can be a radial flow turbine wheel (e.g., radial inlet flow) or can be a mixed-flow turbine wheel (e.g., mixed inlet flow) where an angle can define at least a portion of a leading edge such that incoming exhaust has both a radial component and an axial component. FIG. 5 shows an example of a mixed-flow turbine wheel blade 5090 where a leading edge 5091 is at an angle other than 90 degrees with respect to the r-axis and is at an angle other than 0 degrees with respect to the z-axis (e.g., approximately 1 degree to approximately 89 degrees). As an example, a turbine wheel blade may be radially stacked or not radially stacked (e.g., non-radially stacked).

FIG. 5 also shows a line labeled $za_{tip}$ that is parallel to a rotational axis of a turbine wheel that includes the blade 590 and where the line $za_{tip}$ passes through the tip point 595 at an outer end of the trailing edge 599, which corresponds to the largest radius of the trailing edge 599 and which corresponds to an uppermost point of the shroud edge 598 (e.g., the largest z position of the shroud edge 598). As shown, the shroud edge 598 is straight in a region near the tip point 595. Referring to FIG. 2, the blade 254 has a similarly straight shroud edge in a region near a tip point where the shroud edge and the trailing edge meet. Correspondingly, as mentioned, the turbine housing 204 has a shroud portion 240 with a cylindrical portion 244, which defines a cylindrical surface in a region that corresponds to the straight shroud edge region of the blade 254. In FIG. 2, the turbine wheel 205 is approximated to be in a projected view; noting that for a turbine wheel that includes an odd number of blades, a projected view will not necessarily show a maximum diameter as defined by a circle that inscribes tips where each tip is at a maximum radius of a trailing edge of a respective blade.

As shown in FIG. 2 and FIG. 5, the blades 254 and 590 include a cylindrical contour along their respective shroud edges. Further, the blade 254 is illustrated such that the trailing edge has a constant z dimension (e.g., axial height or axial length); whereas, in FIG. 5, the trailing edge 599 is sloped such that the tip point 595 is slightly less than the hub point 594. While the trailing edges differ for the blades 254 and 590, the shroud edges both include a cylindrical contour.

FIG. 5 shows an axial length of the blade 590 as $\Delta z$, which is measured between an axial position of the point 592 and an axial position of the point 594, and an axial length of the shroud edge 598 as $\Delta z_{SE}$, which is measured between an axial position of the point 593 and an axial position of the point 595. For the blade 590, the shroud edge axial length $\Delta z_{SE}$ is approximately 50 percent of the axial length $\Delta z$ and the horizontally straight region of the shroud edge 598 (e.g., cylindrical contour where the straight region is parallel to the axis of rotation) is approximately 12 percent of the shroud edge axial length $\Delta z_{SE}$ and approximately 6 percent of the axial length $\Delta z$.

As an example, a turbine wheel can include blades where each of the blades does not include a straight region along a shroud edge that is parallel to an axis of rotation of the turbine wheel such that each of the blades does not include a cylindrical contour.

As an example, a turbine wheel can include blades where each of the blades includes a sloped region along a shroud edge such that each of the blades includes a conical contour.

Figure 6:
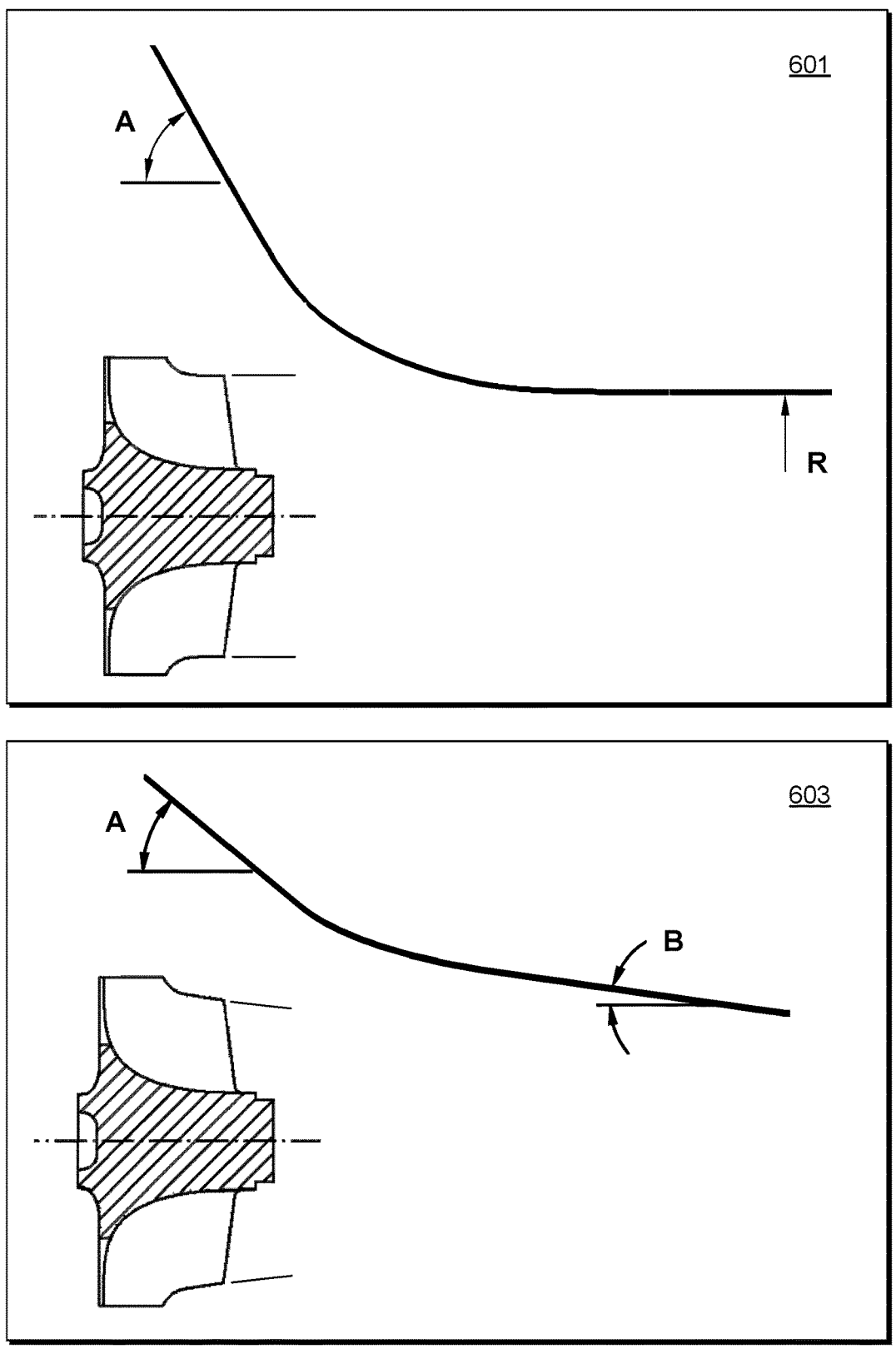
FIG. 6 is a series of views of examples of turbine wheels with shroud edge contours.

FIG. 6 shows an example of a cylindrical contour of a shroud edge of a blade of a turbine wheel 601 and an example of a conical contour of a shroud edge of a blade of a turbine wheel 603. As shown, for a region of the shroud edge proximate to a trailing edge, the cylindrical contour can be defined by a constant radius; whereas, for a region of the shroud edge proximate to a trailing edge, the conical contour can be defined by an angle B (e.g., or a range of radii). In both examples, an angle A can be used to define a region of the shroud edge that is proximate to a leading edge.

Figure 7:
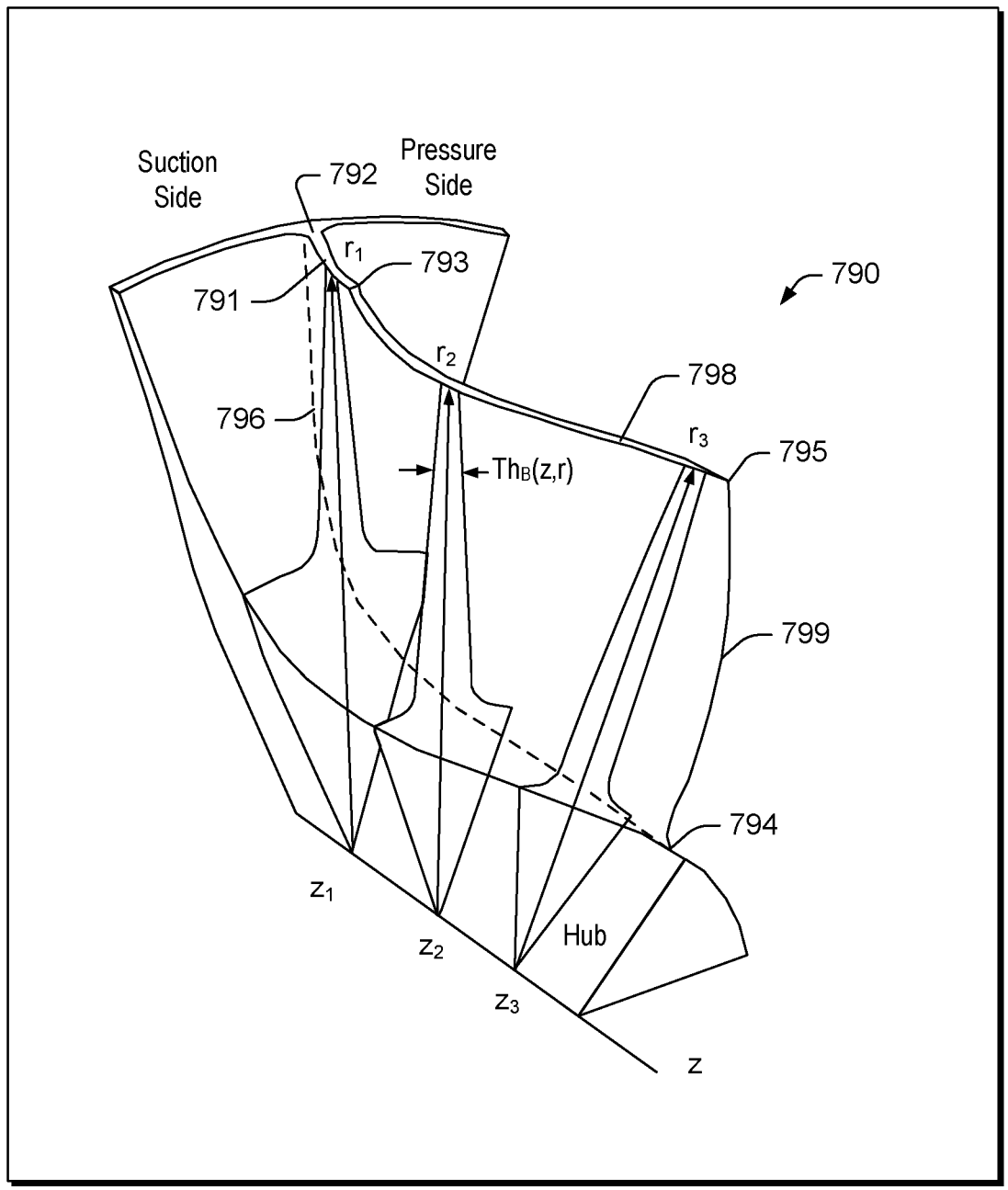
FIG. 7 is a view of a portion of an example of a turbine wheel.

FIG. 7 shows an example of a blade 790 as a section of a turbine wheel that includes a plurality of blades. As shown, the blade 790 includes a leading edge 791, a hub profile 796, a shroud profile 798, a trailing edge 799 and various points 792, 793, 794 and 795, which may be defined in a cylindrical coordinate system. In the example blade 790 of FIG. 7, three radial lines are shown, labeled $r_1$, $r_2$ and $r_3$, which have corresponding axial coordinates $z_1$, $z_2$ and $z_3$, where each of the three radial lines may be referred to as a radial fiber. In FIG. 7, at three different r, $\Theta$ planes at $z_1$, $z_2$ and $z_3$, cross-sectional areas and shapes of the hub and the blade 790 are illustrated. As an example, a blade can be defined in part by a thickness, which can be shown as the thickness $Th_B(z,r)$ at a particular axial dimension and a particular radial dimension. A blade thickness can be a distance that is between a pressure surface (e.g., a pressure side) and a suction surface (e.g., a suction side) of a blade. In the example of FIG. 7, the blade 790 can have a thickness that various in different regions. As an example, a blade may be thinner at a shroud edge (e.g., along a shroud profile) and thicker at a hub edge (e.g., along a hub profile). As shown in FIG. 7, the hub can vary in its radius where the hub can have a smaller radius near a nose and a larger radius near a base (e.g., where the blade 790 joins the backdisk).

With reference to the cylindrical contour 601 of FIG. 6, the blade 790 of FIG. 7 would include a region at the shroud edge 798 that includes the $z_3$, $r_3$ radius as a constant radius with respect to a range of z values; whereas, with reference to the conical contour 603 of FIG. 6, the blade 790 of FIG. 7 would include radii at the shroud edge 798 that decrease with respect to increasing z values. For example, the radius $r_3$ at $z_3$ could be a radius that is within a range of radii (e.g., a larger radius at a z value less than that of $z_3$ and a smaller radius at a z value greater than that of $z_3$) that define a conical contour, which may be represented by an angle (e.g., an angle with respect to the z-axis as the rotational axis of the turbine wheel 790).

In FIG. 7, the radial lines of the blade 790 are also mean lines in that each of the radial lines is centered between the suction side and the pressure side of the blade 790. Another type of line that can be utilized to describe a blade is the camber line (or camberline), which is a mean line of a blade profile that extends from the leading edge to the trailing edge, halfway between the pressure side (pressure surface) and the suction side (suction surface). In the example blade 790 of FIG. 7, a camber line or camber lines can form a camber sheet or camber surface that extends from the leading edge to the trailing edge of the blade 790. For example, the portions of the radial lines $r_1$, $r_2$ and $r_3$ between the hub profile and the leading edge, the shroud edge and the trailing edge can all be in the camber surface for the blade 790. For a given blade, where a radial line at an axial position, between the hub profile and the leading edge, the shroud profile or the trailing edge, does not coincide with the camber surface, that blade is not radially stacked. As an example, a turbine wheel can include blades that are radially stacked or can include blades that are not radially stacked.

Figure 8:
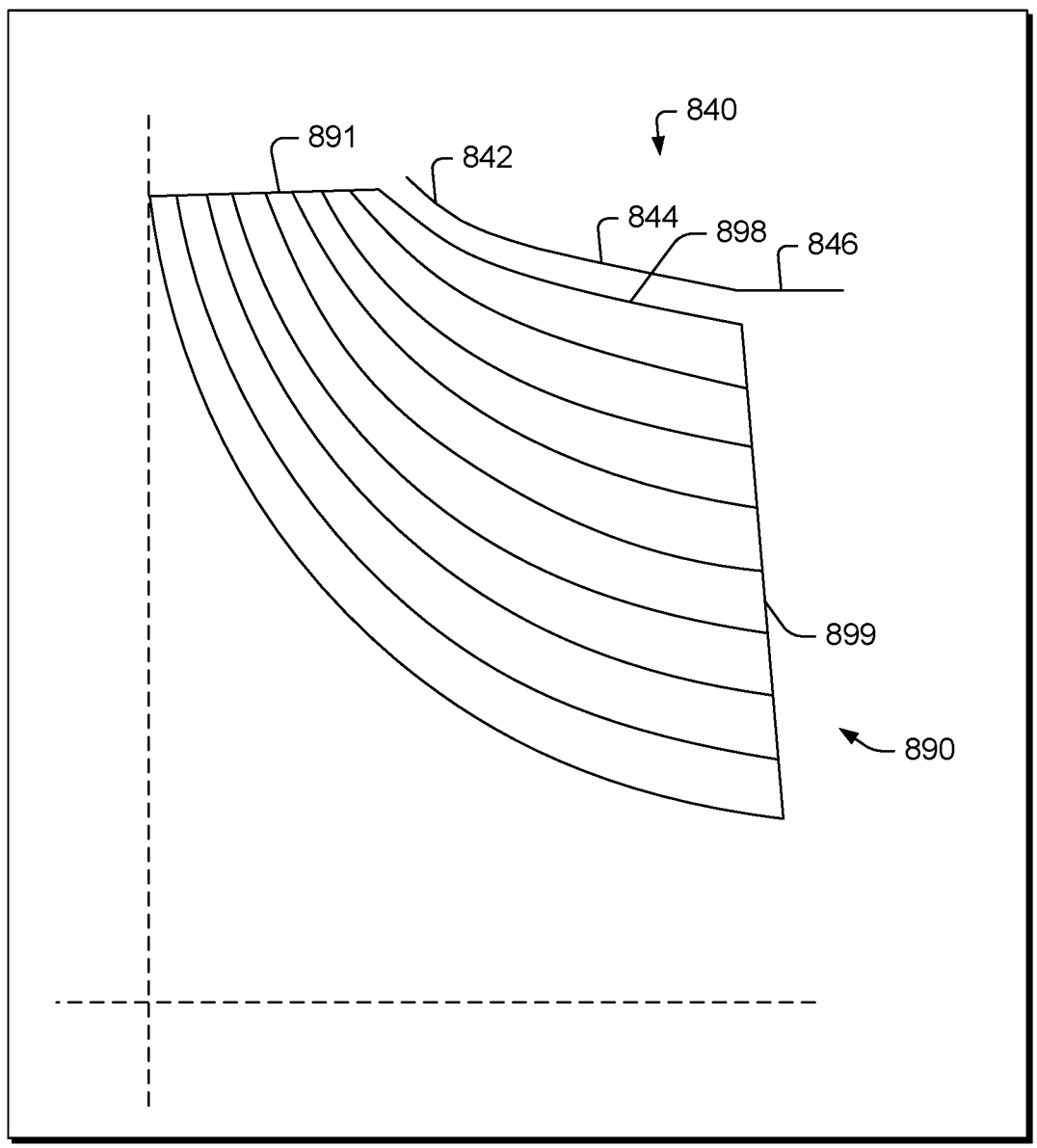
FIG. 8 is a projected view of an example of a turbine wheel blade and a portion of a turbine housing.

FIG. 8 shows an example of a meridional projection of a camber surface of a blade 890 where the blade 890 includes a leading edge 891, a shroud edge 898 and a trailing edge 899 and where the shroud edge 898 includes a conical contour. FIG. 8 also shows a shroud portion 840 of a turbine housing that includes a first, lower portion 842, a second, intermediate, conical portion 844 and a third, upper portion 846.

Figure 9:
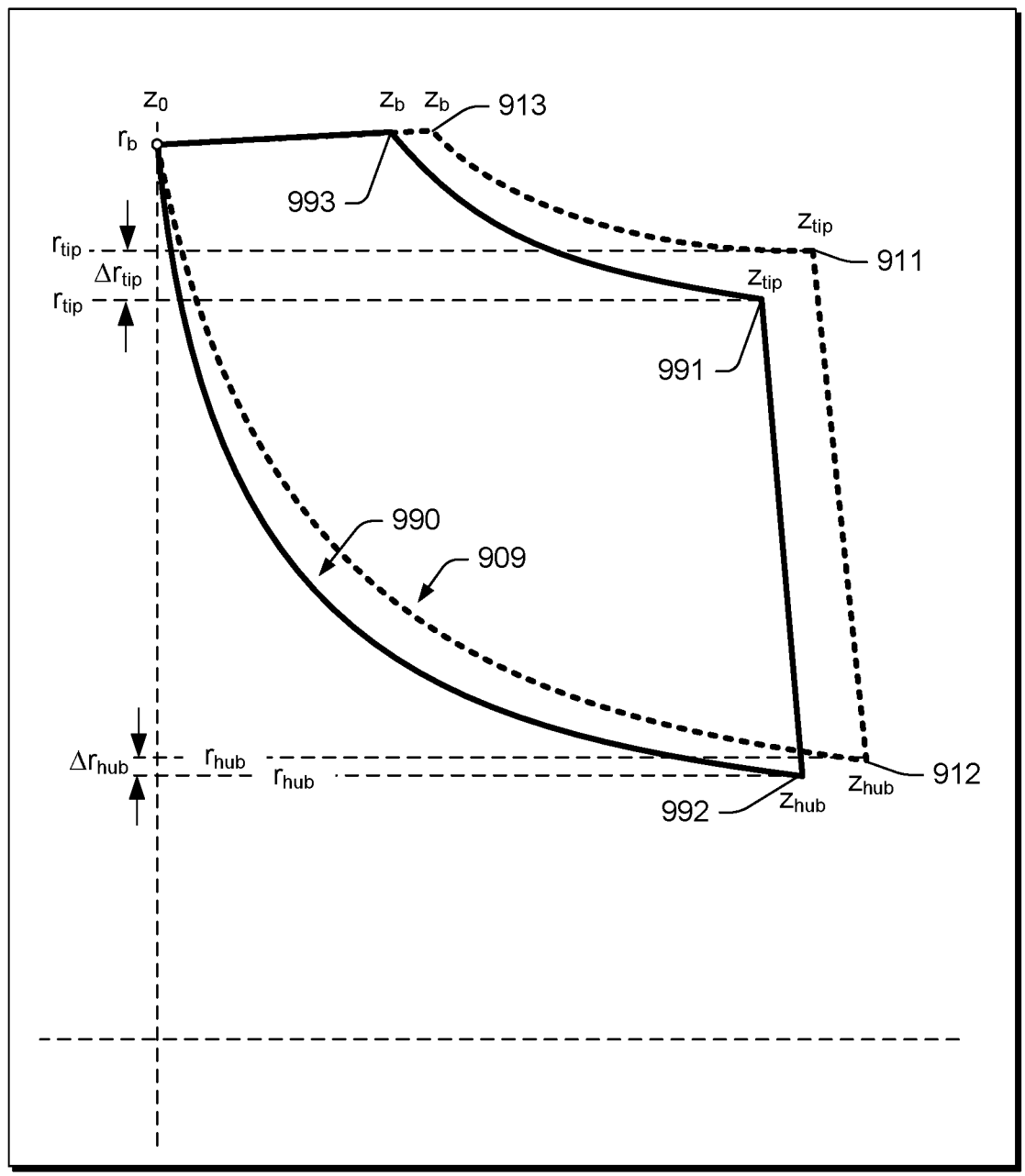
FIG. 9 is an overlay of projected views of two different turbine wheel blades.

FIG. 9 shows an overlay of an example of a blade 909 with a cylindrical contour (dashed line) and a blade 990 with a conical contour (solid line) where a common $z_0$, $r_b$ point is shown at a lower end of the leading edge of the inducer section, where $z_{tip}$ points are shown labeled as 911 and 991, respectively, where $z_{hub}$ points are shown labeled as 912 and 992, respectively, and where $z_b$ points are shown labeled as 913 and 993, respectively. As shown, the blade 990 has a lower tip point ($z_{tip}$) and a lower hub point ($z_{hub}$) than the blade 909. As an example, a turbine wheel with blades where each of the blades includes a conical contour can be referred to as a turbine wheel with a conical exducer; whereas, for a cylindrical contour, a turbine wheel can be referred to as a turbine wheel with a cylindrical exducer. FIG. 9 also shows examples of reductions that can be achieved as to radial positions (see, e.g., $\Delta r_{tip}$ and $\Delta r_{hub}$).

As shown in the examples of FIG. 9, the conical shroud contour, at the wheel exducer, allows for turbine blades with shorter exducer height (e.g., exducer length with respect to an axis of rotation), while achieving the same flow, and throat of a turbine wheel with cylindrical exducer (longer blades).

A reduction in blade height (e.g., blade length with respect to an axis of rotation) can result in better performance by reducing suction side flow separation, lower tip speed which consequently means lower turbine wheel exit swirl and higher diffuser area ratio for better kinetic energy recover at the outlet of a turbine stage.

Shorter blades can also provide benefits such as a reduction in blade and blade root stresses, at the exducer, which can improve turbine wheel low and high cycle fatigue durability (e.g., LCF/HCF).

As explained with respect to the example cylindrical contour 601 of FIG. 6, a radial inflow turbine wheel can include a shroud edge that can be defined by one or more contours, which can include a conical inducer region (see, e.g., the angle A), a curved middle region, and a cylindrical exducer region (see, e.g., the radius R). As to the example conical contour 603, the cylindrical exducer region is not present; rather, there is a conical exducer region. As an example, a conical exducer region can improve performance (e.g., total-static efficiency), reduce exducer stresses for better mechanical durability (e.g., increased life), and/or provide a potential reduction in turbine wheel mass (e.g., improved transient response). As an example, a turbocharger can include a turbine assembly that includes a turbine wheel with a conical exducer where the turbine wheel is more efficient and of the same or less mass than a turbine wheel with a cylindrical exducer. Further, as an example, a turbine housing can include a conical shroud profile that matches at least a portion of a conical exducer of a turbine wheel where, for example, the turbine housing can be of the same or lesser mass than a turbine housing with a cylindrical shroud profile that matches a turbine wheel with a cylindrical exducer.

As an example, a method of manufacturing a turbine wheel with a conical exducer can include grinding a cast wheel contour using a grinding wheel that is dressed with a desired contour shape. For example, a grinding wheel can be shaped and then used to grind a turbine wheel to provide a turbine wheel with a conical exducer. For example, a turbine wheel with blades with a cylindrical exducer defined by a cylindrical shroud edge profile at the exducer section can be ground to form a conical exducer defined by a conical shroud edge profile at the exducer section. For example, a turbine wheel may be cast where blades include a leading edge as shown for the blade 990 and where the trailing edge is longer than that shown for the blade 900. In such an example, a grinder can grind the blades of the turbine wheel to form the conical contour and shorten the trailing edge such that $r_{tip}$, 991 is as shown in the example blade 990 of FIG. 9.

Referring again to FIG. 9, as shown, a higher wheel tip of a cylindrical exducer (see $z_{tip}$, 911) demands use of a higher turbine wheel hub (e.g., higher inner diameters) to reduce stress at the blade root; whereas, for a conical exducer, a lower tip (see $z_{tip}$, 991) will flow in a manner akin to a higher tip, which can alleviate demand for a higher turbine wheel hub (see $z_{hub}$, 912 and $z_{hub}$, 992).

In the example of FIG. 9, various dimensions can be utilized to characterize the blades 909 and 990. For example, consider blade lengths as measured with respect to the rotational axis and, for example, consider blade radii as measured with respect to the rotational axis. As shown, radii include $r_{hub}$, 912 and $r_{hub}$ 992 and $t_{tip}$ 911 and $r_{tip}$, 991, which define and $\Delta r_{hub}$ and $\Delta r_{tip}$, respectively. As an example, various radii can be referenced with respect to the blade radius $r_b$ where, for example, a dimension from $r_{hub}$ to $r_b$, a dimension from $r_{tip}$ to $r_b$ and/or a dimension from $r_{hub}$ to $r_{tip}$ can be utilized to characterize the blades 909 and 990. Such dimensions may be utilized to define ratios, fractions, percentages, etc. For example, for the blade 990, the dimension from $r_{tip}$ to $r_b$ is approximately 25 percent of the dimension from $r_{hub}$ to $r_b$; whereas, for the blade 909, the dimension from $r_{tip}$ to $r_b$ is less, at approximately 17 percent of the dimension from $r_{hub}$ to $r_b$. As another example, alternatively or in addition to the foregoing example, for the blade 990, the dimension from $r_{hub}$ to $r_{tip}$ is approximately 75 percent of the dimension from $r_{hub}$ to $r_b$; whereas, for the blade 909, the dimension from $r_{tip}$ to $r_b$ is greater, at approximately 83 percent of the dimension from $r_{hub}$ to $r_b$. As illustrated in FIG. 9, a radial dimension of a shroud edge between a tip of a leading edge at an inducer section ($r_b$) and a tip of a trailing edge at an exducer section ($r_{tip}$) can be greater as a percentage of the maximum blade radius (e.g., $r_b$) for the blade 990 with the conical contour along the shroud edge at the exducer section than the blade 909 with the cylindrical shroud edge at the exducer section and, for example, the trailing edge at an exducer section can be lesser as a percentage of the maximum blade radius (e.g., $r_b$) for the blade 990 with the conical contour along the shroud edge at the exducer section than the blade 909 with the cylindrical shroud edge at the exducer section. In the examples of FIG. 9, the ratio of the shroud edge radial length (e.g., $r_{tip}$ to $r_b$) to the trailing edge radial length (e.g., $r_{hub}$ to $r_{tip}$) for the blade 990 is approximately 0.32 (e.g., approximately 32 percent); whereas, that ratio is approximately 0.2 (e.g., approximately 20 percent) for the blade 909.

As shown by the hub profiles of the blades 909 and 990, the blade 990 as part of a turbine wheel can have a smaller volume hub than the blade 909 where, for example, $r_b$ and $z_0$ may be common dimensions. As an example, a smaller volume hub can reduce mass of a turbine wheel, which may result in a more responsive turbine and, hence, a more responsive turbocharger when compared to a larger volume and larger mass hub.

As explained, a turbine wheel can be a radial inflow turbine wheel with contours that consist of a conical inducer region at leading edge of a blade, a curved middle portion of a shroud edge of the blade, and a cylindrical exducer region of the shroud edge of the blade where the shroud edge approaches and meets the trailing edge of the blade. As explained, as an example, a turbine wheel can be a radial inflow turbine wheel (e.g., or a mixed inflow turbine wheel) where, rather than a cylindrical exducer region, the shroud edge of the blade includes a conical exducer region where the shroud edge approaches and meets the trailing edge of the blade.

Figure 10:
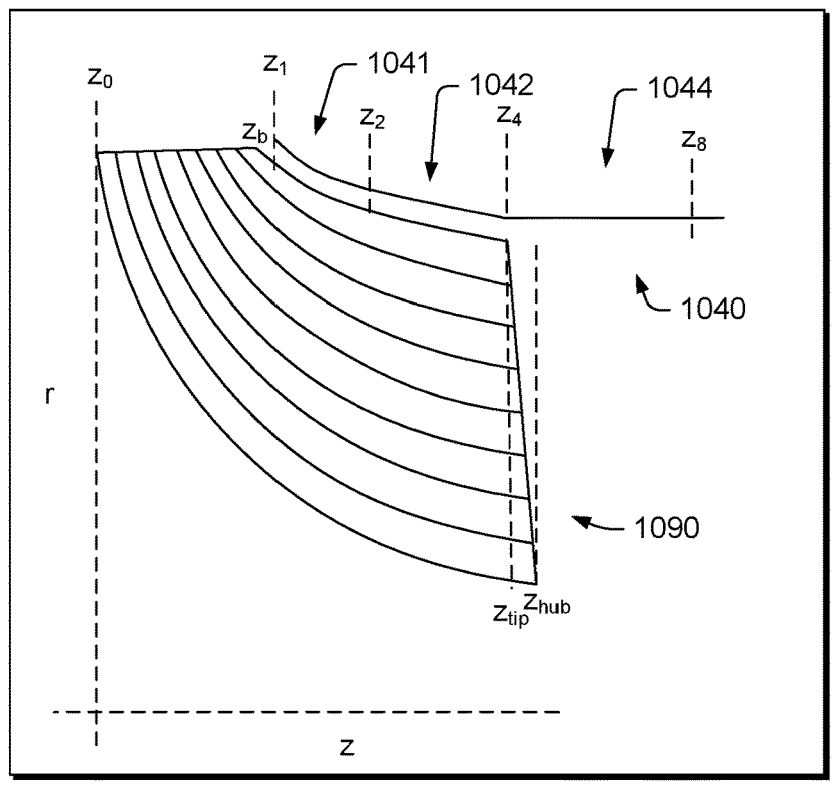
FIG. 10 is a series of projected views of examples of turbine wheels and turbine wheel housings.
Figure 10:
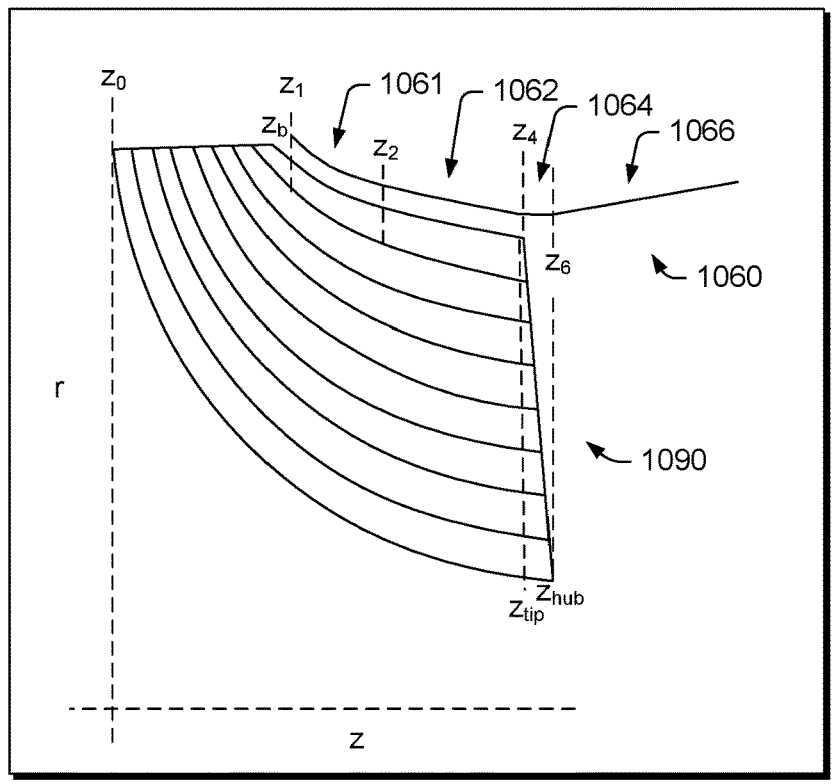

FIG. 10 shows example assemblies which include a turbine wheel with a conical exducer per blades 1090. In such examples, a turbine housing 1040 can include a curved region 1041 (e.g., from $z_1$ to $z_2$) and a conical region 1042 (e.g., from $z_2$ to $z_4$) that transitions to a cylindrical region 1044 at an axial dimension (e.g., $z_4$) that includes an axial dimension (e.g., $z_8$) that is greater than an axial dimension of a trailing edge tip ($z_{tip}$), where the axial dimension is measured in a direction from a base to a nose of a turbine wheel (e.g., in a direction of axial flow of exhaust).

As shown in the example turbine housing 1060, the turbine housing 1060 includes a curved region 1061 (e.g., from $z_1$ to $z_2$) and a conical region 1062 (e.g., from $z_2$ to $z_4$) that transitions to a cylindrical region 1064 (e.g., from $z_4$ to $z_6$) that transitions to a conical diffuser region 1066 (e.g., at $z_6$) where the conical diffuser region 1066 has an increasing diameter with respect to increasing axial position (e.g., in a direction outwardly away from a turbine wheel). In such an example, the axial span of the cylindrical region 1064 can be tailored for one or more purposes and, for example, the enlarging conical diffuser region 1066 can be included at greater axial dimensions.

In the example turbine housing 1060, the cylindrical region 1064 is illustrated as approximately of an axial length or axial span as measured between axial positions of ends of the trailing edge of the blade 1090 (e.g., a distance from $z_{tip}$ to $z_{hub}$ can be approximately equal to the distance $z_4$ to $z_6$). For example, a relatively short cylindrical region can be included in a turbine housing shroud portion where the cylindrical region is after a conical region and before the start of diffusing (e.g., increase of pressure) further away from the turbine wheel trailing edge tip to help reduce risk of flow reversal (e.g., flow pushed back inside the turbine wheel passage) for promoting optimal performance.

As to the examples turbine housings 1040 and 1060 of FIG. 10, each has a transition from the conical region with decreasing radius to a constant radius cylindrical region. As an example, a turbine housing can include a transition from a decreasing radius region to a constant or an increasing radius region. Such an approach acts to terminate the decreasing radius region, which would result in a lesser cross-sectional area axially beyond an outermost tip of a trailing edge that would give rise to a flow restriction. As an example, a turbine housing can include a shroud portion that has a smallest radius (e.g., smallest diameter) at an axial dimension that corresponds to a trailing edge of a blade of a turbine wheel (e.g., an exducer of a turbine wheel). As an example, the smallest radius may characterize a cylindrical region, for example, as a conical region transitions to a cylindrical region where the cylindrical region spans an axial length. As an example, the axial dimension $z_4$ of the turbine housing 1040 and/or of the turbine housing 1060 may be approximately equal to the axial dimension $z_{tip}$ of the turbine wheel blade 1090. In the examples of FIG. 10, various radial dimensions (see, e.g., FIG. 9) may be utilized to characterize the blade 1090 and/or to characterize the turbine housing 1040 and/or the turbine housing 1060. For example, radial dimensions (e.g., radial coordinates) for the various axial dimensions (e.g., axial coordinates) may be specified using the r, z coordinate system as shown.

Figure 11:
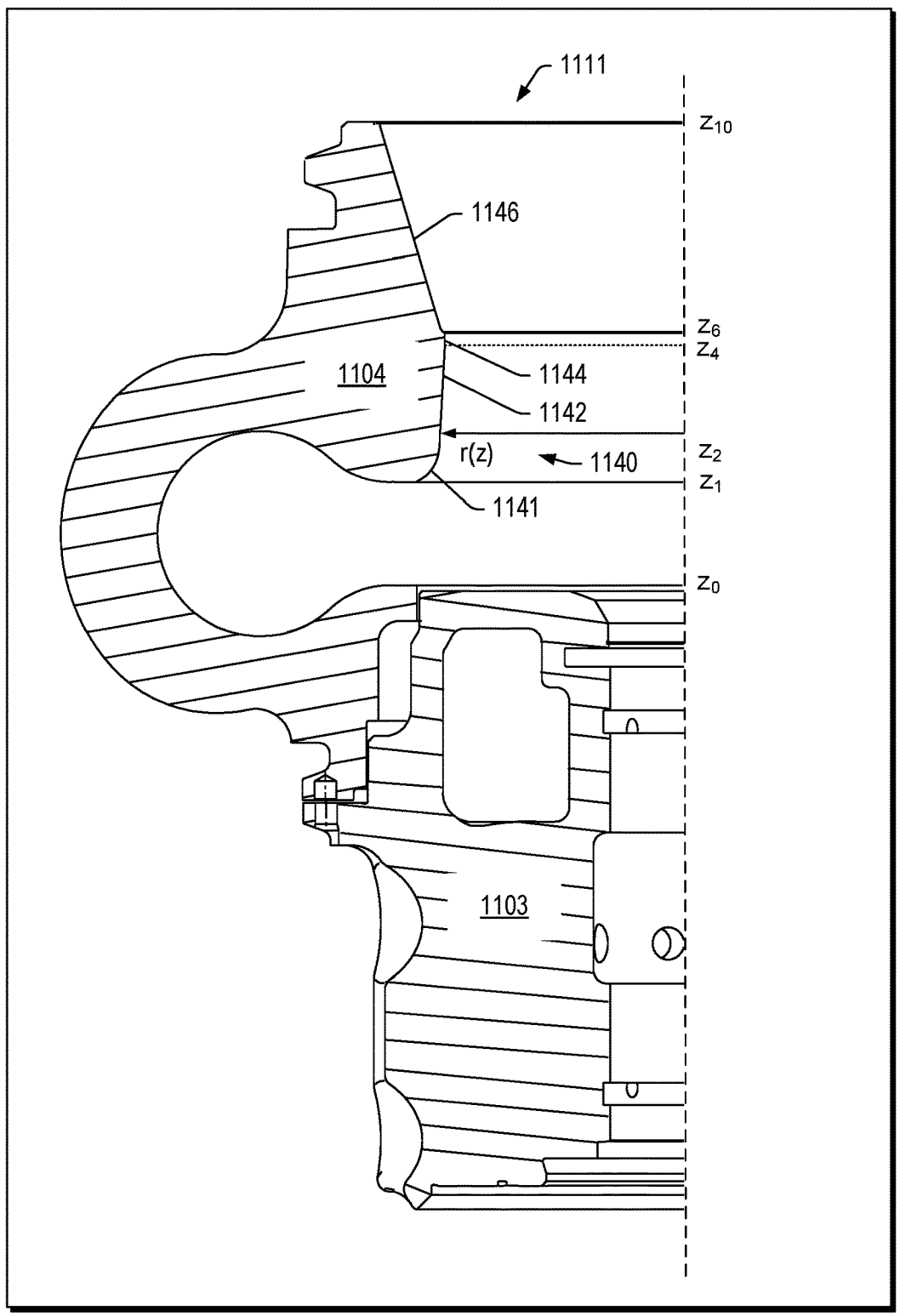
FIG. 11 is a cutaway view of an assembly that includes a center housing and a turbine housing.

FIG. 11 shows an example of an assembly 1100 that includes a center housing 1103 operatively coupled to a turbine housing 1104 where the turbine housing 1104 includes a shroud portion 1140 with decreasing radius with respect to increasing axial position toward an exhaust outlet 1111. As shown, the shroud portion 1140 includes an annular ridge portion 1141 that transitions to another portion 1142 that can be defined by a conical contour (e.g., a cone angle, etc.). In the example of FIG. 11, the portion 1144 transitions to an intermediate portion 1144 that is intermediate the portion 1142 and a diffuser portion 1146. In the example of FIG. 11, the intermediate portion 1144 has a non-decreasing radius such as, for example, a constant radius (e.g., a cylindrical contour). The intermediate portion 1144 transitions to the diffuser portion 1146, which is shown as including an increasing radius with respect to increasing axial position. As an example, the assembly 1100 can include a turbine wheel that includes blades where each blade includes a shroud edge where the shroud edge has a minimum axial coordinate position where the shroud edge meets a leading edge, and a maximum axial coordinate position where the shroud edge meets a trailing edge, and where, from the minimum axial coordinate position to the maximum axial coordinate position, the shroud edge has a decreasing radial coordinate position.

In the example of FIG. 11, various axial dimensions are shown, including $z_0$, $z_1$, $z_2$, $z_4$, $z_6$, $z_8$, and $z_{10}$, and a radial dimension is shown as r(z), which can vary or be constant with respect to different axial coordinates (z). As an example, one or more features of a turbine housing, a blade, a turbine wheel, etc., may be defined with respect to one or more of a radial coordinate (e.g., r), an axial coordinate (e.g., z), and an azimuthal coordinate (e.g., Θ).

As an example, a turbocharger turbine assembly can include a turbine housing that includes a longitudinal axis, an exhaust inlet, an exhaust volute, an annular exhaust nozzle disposed a radial distance from the longitudinal axis, a shroud portion, a diffuser portion and an exhaust outlet; and a turbine wheel that includes a hub that includes a rotational axis aligned with the longitudinal axis of the turbine housing, a backdisk and a nose, where the rotational axis defines an axial coordinate (z) in a cylindrical coordinate system that includes a radial coordinate (r) and an azimuthal coordinate (Θ) in a direction of intended rotation about the rotational axis; and blades that extend outwardly from the hub, where each of the blades includes a shroud edge, a leading edge, a trailing edge, a pressure side, and a suction side, where the shroud edge includes a minimum axial coordinate position where the shroud edge meets the leading edge, and a maximum axial coordinate position where the shroud edge meets the trailing edge, and where, from the minimum axial coordinate position to the maximum axial coordinate position, the shroud edge has a decreasing radial coordinate position. In such an example, the decreasing radial coordinate position of the shroud edge, where the shroud edge meets the trailing edge, can be defined by a cone angle.

As an example, a portion of a shroud edge and/or a portion of a turbine housing can be defined by a cone or a portion of a cone. As an example, a cone can be a right cone with a height h and a base radius r oriented along a z-axis, with a vertex pointing up, and with the base located at z=0. Such a cone can be defined by parametric equations:

$$x = [(h-u)/h]*r*\cos\Theta \quad (1)$$

$$y = [(h-u)/h]*r*\sin\Theta \quad (2)$$

$$z = u \quad (3)$$

for u in [0, h] and Θ in [0, 2π).

The opening angle of a right cone can be is the vertex angle made by a cross section through the apex and center of the base. For example, for a cone of height h and radius r, it may be given by:

$$\varphi = 2*\tan^{-1}(r/h). \quad (4)$$

As an example, a cone angle with respect to an axis along the height h may be specified as divided by 2, where in revolution a surface defines a cone with the opening angle.

Adding the squares of (1) and (2) shows that an implicit Cartesian equation for the cone is given by:

$$(x^2+y^2)/(c^2) = (z-z_0)^2 \quad (5)$$

where c=r/h is the ratio of radius to height at some distance from the vertex, a quantity sometimes called the opening angle, and $z_0$=h is the height of the apex above the z=0 plane.

The volume of a cone can be defined as $V=\frac{1}{3}*A_b*h$, where Ab is the base area and h is the height and where, for a circular base, $V=\frac{1}{3}*\pi r^2 h$.

In various examples, a cone or a portion of a cone can define a portion of a turbine housing (e.g., a shroud portion) and/or a portion of an exducer region of a turbine wheel. In the example of FIG. 6, the angle B can be one-half of an opening angle of a cone and, for example, the angle A may be approximated via one-half an opening angle of a different cone. As shown in FIG. 6, the angle B is less than the angle A and where the radius R is indicated, it can be defined by a cylinder where a base would have a cylindrical wall at a 90 degree angle to the base.

In the example of the blade of the turbine wheel 603 of FIG. 6, the angle B is less than the angle A. As an example, the angle B may be less than one-half the angle A. In the example of the blade of the turbine wheel 603 of FIG. 6, the angle B is approximately 10 degrees and the angle A is approximately 40 degrees. In the example of the blade of the turbine wheel 601 of FIG. 6, the angle A is approximately 60 degrees. As an example, a turbine wheel can include an angle A and an angle B that can each be defined using a cone angle (e.g., half an opening angle of a cone) where the sum of the cone angles can be less than a cone angle of a turbine wheel that includes a cylindrical exducer region. For example, 40 degrees plus 10 degrees is less than 60 degrees. As an example, an exducer region cone angle may be greater than approximately 1 degree and less than approximately 20 degrees. As an example, an exducer region cone angle may be greater than approximately 5 degrees and less than approximately 15 degrees. As an example, where two angles are utilized to define a shroud edge profile of a blade of a turbine wheel, with the first angle proximate to or adjacent to a leading edge of an inducer region and the second angle proximate to or adjacent to a trailing edge of an exducer region, the second angle can be less than approximately one-half of the first angle or, for example, approximately one-third of the first angle or, for example, approximately one-fourth of the first angle. As an example, the second angle can be greater than approximately one-fifteenth of the first angle or, for example, greater than approximately one-tenth of the first angle. Such fractions (or percentages) may be utilized to define one or more ranges for an angle that defines an exducer region of a turbine wheel.

As an example, a turbocharger turbine wheel can include an exducer region with a shroud edge that includes a decreasing radial coordinate position that defines a cone angle that is one-half the opening angle of a cone and where the cone angle can be an angle selected from a range from 5 degrees to 20 degrees. In such an example, the exducer region can be defined as including a conical contour.

As an example, from a minimum axial coordinate position of a shroud edge to a maximum axial coordinate position of the shroud edge, a shroud portion of a turbine housing can have a decreasing radial coordinate position. For example, consider a decreasing radial coordinate position of the shroud portion of the turbine housing where, at the maximum axial coordinate position of the shroud edge, the shroud portion can be defined by a cone angle. As an example, a shroud portion of a turbine housing can transition to an intermediate portion that is intermediate the shroud portion and a diffuser portion where the diffuser portion has a non-decreasing radial coordinate position. In such an example, the non-decreasing radial coordinate position of the intermediate portion can be at a constant radial coordinate position (e.g., a cylindrical portion). As an example, an intermediate portion can transition to a diffuser portion at a maximum axial coordinate position of a trailing edge where the diffuser portion has an increasing radial coordinate position. In such an example, the maximum axial coordinate position of the trailing edge can be where the trailing edge meets a hub.

As an example, where a shroud portion of a turbine housing transitions to an intermediate portion, the intermediate portion can be intermediate the shroud portion and a diffuser portion where the transition is from a conical contour to a cylindrical contour at a maximum axial coordinate position of the shroud edge. In such an example, the intermediate portion can transition to the diffuser portion where the transition is from a cylindrical contour to a conical counter having an increasing radial coordinate position.

As an example, a turbocharger turbine wheel can have a number of blades that is selected from a range of 3 blades to 30 blades. For example, consider a turbocharger turbine wheel with eleven blades (e.g., where the number of the blades is eleven).

As an example, blades can be radial inlet flow blades and/or blades can be mixed inlet flow blades.

As an example, a turbocharger can include a compressor assembly; a center housing assembly operatively coupled to the compressor assembly; and a turbine assembly operatively coupled to the center housing assembly, where the turbine assembly includes a turbine housing that includes a longitudinal axis, an exhaust inlet, an exhaust volute, an annular exhaust nozzle disposed a radial distance from the longitudinal axis, a shroud portion, a diffuser portion and an exhaust outlet; and a turbine wheel that includes a hub that includes a rotational axis aligned with the longitudinal axis of the turbine housing, a backdisk and a nose, where the rotational axis defines an axial coordinate (z) in a cylindrical coordinate system that includes a radial coordinate (r) and an azimuthal coordinate ($\Theta$) in a direction of intended rotation about the rotational axis; and blades that extend outwardly from the hub, where each of the blades includes a shroud edge, a leading edge, a trailing edge, a pressure side, and a suction side, where the shroud edge includes a minimum axial coordinate position where the shroud edge meets the leading edge, and a maximum axial coordinate position where the shroud edge meets the trailing edge, and where, from the minimum axial coordinate position to the maximum axial coordinate position, the shroud edge includes a decreasing radial coordinate position.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbocharger turbine assembly comprising:
a turbine housing that comprises a longitudinal axis, an exhaust inlet, an exhaust volute, an annular exhaust nozzle disposed a radial distance from the longitudinal axis, a shroud portion, a diffuser portion and an exhaust outlet; and
a turbine wheel that comprises a hub that comprises a rotational axis aligned with the longitudinal axis of the turbine housing, a backdisk and a nose, wherein the rotational axis defines an axial coordinate (z) in a cylindrical coordinate system that comprises a radial coordinate (r) and an azimuthal coordinate ($\Theta$) in a direction of intended rotation about the rotational axis; and
blades that extend outwardly from the hub, wherein each of the blades comprises
a shroud edge,
a leading edge,
a trailing edge,
a pressure side, and
a suction side,
wherein the shroud edge comprises
a minimum axial coordinate position where the shroud edge meets the leading edge, and
a maximum axial coordinate position where the shroud edge meets the trailing edge, and
wherein, from the minimum axial coordinate position to the maximum axial coordinate position, the shroud edge comprises a decreasing radial coordinate position.

2. The turbocharger turbine assembly of claim 1 wherein the decreasing radial coordinate position of the shroud edge, where the shroud edge meets the trailing edge, is defined by a cone angle.

3. The turbocharger turbine assembly of claim 1 wherein, from the minimum axial coordinate position of the shroud edge to the maximum axial coordinate position of the shroud edge, the shroud portion of the turbine housing comprises a decreasing radial coordinate position.

4. The turbocharger turbine assembly of claim 3 wherein the decreasing radial coordinate position of the shroud portion of the turbine housing, at the maximum axial coordinate position of the shroud edge, is defined by a cone angle.

5. The turbocharger turbine assembly of claim 3 wherein the shroud portion of the turbine housing transitions to an intermediate portion that is intermediate the shroud portion and the diffuser portion that comprises a non-decreasing radial coordinate position.

6. The turbocharger turbine assembly of claim 5 wherein the non-decreasing radial coordinate position of the intermediate portion is a constant radial coordinate position.

7. The turbocharger turbine assembly of claim 5 wherein the intermediate portion transitions to the diffuser portion at a maximum axial coordinate position of the trailing edge and wherein the diffuser portion comprises an increasing radial coordinate position.

8. The turbocharger turbine assembly of claim 7 wherein the maximum axial coordinate position of the trailing edge is where the trailing edge meets the hub.

9. The turbocharger turbine assembly of claim 3 wherein the shroud portion of the turbine housing transitions to an intermediate portion that is intermediate the shroud portion and the diffuser portion wherein the transition is from a conical contour to a cylindrical contour at the maximum axial coordinate position of the shroud edge.

10. The turbocharger turbine assembly of claim 9 wherein the intermediate portion transitions to the diffuser portion, wherein the transition is from a cylindrical contour to a conical counter having an increasing radial coordinate position.

11. The turbocharger turbine wheel of claim 1 wherein a number of the blades is selected from a range of 3 blades to 30 blades.

12. The turbocharger turbine wheel of claim 1 wherein the decreasing radial coordinate position defines a cone angle that is one-half the opening angle of a cone and wherein the cone angle is selected from an angle in a range from 5 degrees to 20 degrees.

13. The turbocharger turbine wheel of claim 1 wherein the blades comprise radial inlet flow blades.

14. The turbocharger turbine wheel of claim 1 wherein the blades comprise mixed inlet flow blades.

15. A turbocharger comprising:
a compressor assembly;
a center housing assembly operatively coupled to the compressor assembly; and
a turbine assembly operatively coupled to the center housing assembly, wherein the turbine assembly comprises
a turbine housing that comprises a longitudinal axis, an exhaust inlet, an exhaust volute, an annular exhaust nozzle disposed a radial distance from the longitudinal axis, a shroud portion, a diffuser portion and an exhaust outlet; and
a turbine wheel that comprises a hub that comprises a rotational axis aligned with the longitudinal axis of the turbine housing, a backdisk and a nose, wherein the rotational axis defines an axial coordinate (z) in a cylindrical coordinate system that comprises a radial coordinate (r) and an azimuthal coordinate ($\Theta$) in a direction of intended rotation about the rotational axis; and
blades that extend outwardly from the hub, wherein each of the blades comprises
a shroud edge,
a leading edge,
a trailing edge,
a pressure side, and
a suction side,
wherein the shroud edge comprises
a minimum axial coordinate position where the shroud edge meets the leading edge, and
a maximum axial coordinate position where the shroud edge meets the trailing edge, and
wherein, from the minimum axial coordinate position to the maximum axial coordinate position, the shroud edge comprises a decreasing radial coordinate position.

* * * * *